US007007964B2

(12) United States Patent

Lewoczko

(10) Patent No.: US 7,007,964 B2
(45) Date of Patent: Mar. 7, 2006

(54) MOTORCYCLE LIFT BAR AND METHOD

(76) Inventor: Myron M. Lewoczko, 32 Thomas St., Middleboro, MA (US) 02234

( * ) Notice: Subject to any disclaimer, the term of this patent is extended or adjusted under 35 U.S.C. 154(b) by 326 days.

(21) Appl. No.: 10/225,971

(22) Filed: Aug. 22, 2002

(65) Prior Publication Data

US 2004/0046356 A1 Mar. 11, 2004

(51) Int. Cl.
*B62H 3/12* (2006.01)

(52) U.S. Cl. ....................................... 280/293; 254/237

(58) Field of Classification Search ................ 254/237, 254/376, 243, 131; 280/293
See application file for complete search history.

(56) References Cited

U.S. PATENT DOCUMENTS

| | | | | |
|---|---|---|---|---|
| 1,964,624 A * | 6/1934 | Dwork | ....................... | 254/376 |
| 2,884,226 A | 4/1959 | Palka | | |
| 3,746,066 A * | 7/1973 | McIntyre | .................... | 150/107 |
| 3,952,893 A * | 4/1976 | Kolesar | ...................... | 414/462 |
| 4,042,208 A * | 8/1977 | Arakaki | ...................... | 254/8 B |
| 4,199,182 A * | 4/1980 | Sunesson | ................. | 24/68 CD |
| 4,611,961 A * | 9/1986 | Van Iperen et al. | ........... | 410/20 |
| 4,795,136 A * | 1/1989 | Haefner | ...................... | 254/336 |
| 5,358,265 A | 10/1994 | Yaple | | |
| 5,445,487 A * | 8/1995 | Koscinski, Jr. | ............. | 414/543 |
| 5,562,534 A * | 10/1996 | McGough | ................... | 452/187 |
| 5,803,324 A * | 9/1998 | Silberman et al. | ....... | 224/42.23 |
| 5,967,732 A * | 10/1999 | Floyd | ......................... | 414/462 |
| 5,984,337 A | 11/1999 | Dubin | | |
| 6,152,675 A * | 11/2000 | Compton | .................... | 414/543 |

FOREIGN PATENT DOCUMENTS

| | | |
|---|---|---|
| DE | 3514704 A1 | 10/1985 |

* cited by examiner

*Primary Examiner*—Lesley D. Morris
*Assistant Examiner*—Paul Royal, Jr.
(74) *Attorney, Agent, or Firm*—Robert R. Deleault, Esq.; Mesmer & Deleault, PLLC

(57) ABSTRACT

A two-wheeled vehicle uprighting device having a support bar with a stabilizing base on one end and a ratcheting mechanism on another end, and a lifting strap with a first end adapted for attachment to a lower portion of the two-wheeled vehicle and a second end for engaging relationship about a spindle of said ratchet mechanism.

21 Claims, 6 Drawing Sheets

MOTORCYCLE LIFT BAR AND METHOD

BACKGROUND OF THE INVENTION

1. Field of the Invention

The present invention relates generally to the field of motorcycles. More particularly, the present invention relates to lifting a motorcycle that has fallen on its side to an upright position.

2. Description of the Prior Art

Motorcycles and other two-wheeled motorized vehicles are used extensively for both recreational and transportation purposes. They may peripherally have a sidecar for transporting goods or one or two additional persons, and perhaps a trailer for transporting goods, but typically, motorcycles seat one or two persons astride.

A motorcycle is designed to remain upright at all times. A rider maintains the upright position by stabilizing the motorcycle with his or her legs and feet when the motorcycle is stopped in traffic, such as at a red light or a stop sign. In motion, the motorcycle is balanced in the upright position by the distribution of the rider's weight combined with the momentum of the motorcycle. When the motorcycle is not in use, it is kept upright using one of several kickstand apparatuses that are available commercially.

A motorcycle can weigh several hundred pounds. Generally, operator-drivers of motorcycles who lack the physical strength to erect a motorcycle lying on its side, or fearful of injury to themselves, choose not to erect a motorcycle lying on its side. They must wait for help from passers-by or obtain assistance, if possible, from a commercial road service.

In an attempt to circumvent this problem, the prior art has proposed several devices. For example, U.S. Pat. No. 5,984,337 (1999, Dubin) discloses a motorcycle erector device that erects a motorcycle lying on its side. The motorcycle erector device comprises a retaining link with a deformable coating, a self-contained power source of high-pressure, non-inflammable gas stored in a tank with a manually operated tank valve, a pressure reducing gas-metering nipple assembly installed in the tank valve, a flexible tubing gas-transfer assembly with quick-disconnect fitting, and an erecting spheroid assembly. The erecting spheroid assembly comprises a flexible spheroid enclosure, a retention point woven fabric loop, an access and service opening with closure means and an opening for the installation of a gas feed threaded fitting, a gas feed threaded fitting with seals, washers and an assembly nut.

One of the parts used in this invention, the compressed gas tank, may represent a danger to persons and property. If the pressure reducing gas-metering nipple assembly is knocked loose or off the compressed gas tank, either in an accident or due to faulty assembly, high-pressure gas will be allowed to escape quickly from the compressed gas tank. This could have the effect of turning the compressed gas tank into a projectile, which could injure or even kill persons within range or severely damage property within range.

German Patent Abstract DE3514704 (1985, Eberhard) discloses a device with an electric motor drive for raising a motorcycle. The motorcycle has a pivotable support, which can be pivoted about an axis. Essentially, the device consists in that the point of contact with the floor of the free end of the support together with the floor contact points of the wheels of the motorcycle forms a triangle. The formed triangle is such that the center of gravity of the motorcycle lies above the formed triangle while the motorcycle is being raised and when it is standing. The support is actuated by an electric motor by way of a speed-reducing gear mechanism.

This device must be affixed to the frame of the motorcycle in order to operate. It also uses an electric motor drive for raising the motorcycle. If the motorcycle battery does not have sufficient charge to power the electric motor or if the electric motor is damaged in the fall of the motorcycle, the device is inoperable and, thus, the motorcycle cannot be righted using the device. Further, the additional weight added to the frame in front of the motor may impact the performance of the motorcycle when the motorcycle is being ridden.

U.S. Pat. No. 4,377,295 (1983, Lemman) discloses a device which is designed to upright a motorized two-wheeled vehicle, which is lying on the ground, no matter which side it is lying on. The device is attached to the motorized two-wheeled vehicle where the fixably mounted device contains two removable retainer pins and two hinges, a pair of side portions each selectively hingeably connected to the fixably mounted device, and an expansible center portion containing a piston and cylinder which is connected by a hose to a means for pressurizing the cylinder space above the piston. The means for pressuring the cylinder space are either hydraulic or compressed gas. In another embodiment, the expansible center portion of the apparatus is replaced by a screw mechanism, each end of which is hingeably connected to the side portions of the apparatus.

A disadvantage of the Lemman device is that it must be affixed to a motorcycle. Also, the device must use an extrinsic part or mechanism to provide the required force for actually raising the motorcycle. The disclosed mechanisms are a hydraulic system and a gas-pressured system. If the mechanism in use is hydraulic, the system will require regular maintenance and the operator must be assured that the system contains sufficient hydraulic fluid at all times. If the mechanism in use is pressurized gas, the device will require a source for the compressed gas, which must be additionally carried on the motorcycle at all times. The dangers inherent in carrying compressed gas have been discussed above.

U.S. Pat. No. 5,358,265 (1994, Yaple) discloses an automatically actuated motorcycle lift stand. The stand comprises upper and lower stand units on each side of the motorcycle. This configuration enables independent raising of the motorcycle when resting on either side, as well as providing a normal parking function. Yaple also discloses a linear actuator comprising a plurality of concentric telescoping members driven by a small DC motor.

This device must be affixed to the frame of the motorcycle in order to operate. This can impact on motorcycle performance. Also, this device requires an actuating power source in order to operate. If the power source is not functioning when the motorcycle is overturned, the operator will be unable to right the motorcycle.

U.S. Pat. No. 4,494,764 (1985, Kelley) discloses a lift stand and method of using which lifts the rear wheel of a motorcycle off the ground. U.S. Pat. No. 6,341,763 B1 (2002, Lefebvre) discloses a lever-action vehicle lift for raising a motorcycle or other two-wheeled motorized vehicle from the ground surface. Both of these devices are used to raise upright motorcycles off the ground; they are not used or useable to right overturned motorcycles.

Therefore, what is needed is a simple, portable device for raising a fallen motorcycle. What is also needed is a device for raising a fallen motorcycle that can be easily carried on any motorcycle and which does not interfere with the performance of the motorcycle. What is further needed is a device for raising a fallen motorcycle that requires no motorized parts or any hydraulic or compressed gas system for operation.

SUMMARY OF THE INVENTION

If the motorcycle should fall from its upright position, either while in motion or while standing still, the operator must raise the motorcycle back up to its upright position before the motorcycle can be used again. A fully equipped touring motorcycle can weigh approximately 800 to 1000 pounds. This is far too much weight for the average motorcycle rider to lift unassisted. It is possible for more than one person to lift the motorcycle, but this puts the operator of the fallen motorcycle in a position of having to wait for a “good Samaritan” to stop and help lift the motorcycle.

It is an object of the present invention is to provide a simple mechanism and method to raise a fallen motorcycle back to the upright position. It is another object of the present invention to provide a device for raising a fallen motorcycle that is portable and that can be easily carried on any motorcycle. It is a further object of the present invention to provide a device for raising a fallen motorcycle that requires no motorized parts or any hydraulic or compressed gas system for operation.

The present invention achieves these and other objectives by providing an uprighting device having an elongated support body, a stabilizing base plate at one end of the support body, a ratchet mechanism at the other end of the support body, a handle attached to the ratchet mechanism for operating the ratchet mechanism, and a lifting strap for attaching to a fallen motorcycle on one end and for operably connecting to the ratchet mechanism on the other end. Optionally, the stabilizing base plate may be pivotably mounted to the support body.

The elongated support body is preferably tubular and may comprise one or more sections. In one embodiment, the support body is configured into three sections, a top, a middle and a bottom section. The three sections linearly connect in series to each other by way of any mechanism known by those skilled in the art. These three sections are preferably slidingly interconnected. The top and bottom sections may each have a hook-type structure on their outside surfaces for use with the optional intermediate and lower support straps described below. The stabilizing base plate connects to the bottom section of the support body and abuts the ground and provides stability to the support body during the lifting operation. Optionally, the stabilizing base plate may be pivotably attached to the support body and may have a nonslip coating or material adhered to the bottom surface. The top section has a ratchet mechanism fixedly attached to an end opposite the end that removably connects to the middle section.

The lifting strap operably connects on one end to the frame or exhaust pipe of the fallen motorcycle and engages with the ratchet mechanism between the top of the support bar and the handle. Optionally, a slip-preventing support or lower support strap may be used as a spreader support, which connects between the bottom end of the support body and the frame or exhaust pipe of the fallen motorcycle. The slip-preventing support aids in preventing any inadvertent slippage of the stabilizing base plate during the uprighting/lifting operation. The slip-preventing support may be a strap, a bar with hook-type connections at each end or any other structure that prevents the motorcycle from slipping away from the bottom of the support bar, or vice-versa, creating an unsafe situation. The lower hook-type structure on the bottom section helps retain the spreader support at a position along the bottom section of the support body.

The ratchet mechanism is typical of those used with and known in the industry as ratcheting straps. The ratchet mechanism typically has an arm mounted to a spindle. The spindle has a pair of sprockets, each of which is mounted at a respective end of the spindle. A spring-loaded catch is attached to the arm and is biasedly engaged with the sprockets. Also included is a lever which is rotatably mounted to the spindle and which supports a spring-loaded pawl that is biasedly engaged with the sprockets.

In the present invention, unlike the ratcheting straps in the industry, the lever is connected to a handle and the arm is connected to the top end of the elongated support body. The lifting strap has a first end connected to the motorcycle frame or exhaust system and a second free end is connected to and carried about the spindle.

The present invention may optionally include one or more of an extended catch release for the spring-loaded catch spaced along the elongated support body, an extended lever release for releasing the spring-loaded pawl and an intermediate support strap. The extended catch release may be a rigid J-shaped rod or bar that is connected on one end to the spring-loaded catch and has the other end (the J-shaped end) spaced from the catch and along the support body for easy release of the catch by the user. Where tubing is used for the support body, it is convenient to have the main body of the release inside the support body and allow the J-shaped end to protrude through a small, elongated opening in the sidewall of the support body to the outside for easy access to operate the catch release. It is noted that the release is not limited to being a rigid J-shaped rod or bar. Other materials such as rope, wire, wire rope, and the like may be used along with pull loops or release handles and still accomplish the releasing action in order to release the spring-loaded catch.

The lever release may also be made of the same materials as that described for the catch release. The lever release is connected on one end to the spring-loaded pawl and has the other end spaced from the pawl and along the handle for easy release of the pawl by the user. It is noted that neither the catch release nor the lever release is required because the design of the ratchet mechanism is such that it provides access, although not as convenient and easy to use, to each of the catch and pawl mechanisms.

The optional intermediate strap may be an integral part of the lifting strap or it may be a separate strap. The purpose of the intermediate strap is to support a partially uprighted two-wheeled vehicle in the event that the spindle, which carries the lifting strap, becomes full. If it is an integral part of the lifting strap, it is typically connected to the lifting strap at a point along the lifting strap closer to the frame/exhaust pipe end than the end passing through the ratchet mechanism. The intermediate strap has one loose end for looping around the support body of the lifting device and a clasp end that receives the loose end and holds the strap. The clasp end may incorporate any type of belt fastening arrangement known in the art for holding the loose end. It is understood that the ratchet mechanism may be made of sufficient size so that the spindle is capable of holding all of the lifting strap, eliminating the need for an intermediate support strap.

If the intermediate strap is a separate strap, it typically has a loose end and a clasp end. The intermediate strap is looped around the frame or the exhaust pipe of the two-wheeled vehicle proximate to the point of connection of the lifting strap, looped around the support body up near the top end, and typically above the upper hook-type structure of the top section of the support body, and then connected to itself at the clasp end. Regardless of the type of intermediate strap, its function is to support the partially uprighted vehicle while the ratchet mechanism is released allowing the user to empty the full spindle and to pull the loose end and excess length of the lifting strap through the ratchet mechanism for subsequent ratcheting of the strap around the spindle at a new beginning point along the strap body.

To use the vehicle uprighting device, attach the frame end of the lifting strap to the lower frame adjacent the transmission. Place the support bar in a substantially vertical position against the seat about two inches from the rear of the fuel tank with the bar's stabilizing base on the ground. Insert the loose end of the lifting strap through the ratchet mechanism so that as much slack of the strap is pulled through before ratcheting of the strap about the spindle begins. Work the ratchet mechanism to take up enough of the strap so that the tension on the strap maintains the support bar in a vertical position. Place a cushioning material between the seat and the support bar to protect the seat. The cushioning material may be a jacket or the duffel used for storing the present invention.

Where a slip-preventing support or spreader support is used, attach one end of the spreader support to the lower frame or exhaust pipe. Attach the other end to the lower section of the support bar below the hook-type structure (if so equipped) on the bottom section of the support body leaving a little slack in the spreader support. Grasp the handle of the erecting device and operate the ratchet mechanism to tighten the lifting strap, which begins lifting the two-wheeled vehicle. Once the vehicle is raised enough to its upright position, move to the other side of the vehicle and stand on the foot peg or running board and physically right the vehicle to its full upright position.

On motorcycles with no motor guards or crash bars, the spindle of readily available ratchet mechanisms may not have enough capacity to ratchet the motorcycle to its upright position in one stage. Two stages may be required. In this case, an intermediate support strap is required. The procedure is the same as previously described except that once the motorcycle is up about halfway, the intermediate support strap, if integral with the lifting strap, is looped around the upper portion of the support bar above the upper hook-type structure, fastened to its own fastening mechanism and tightened. The ratchet mechanism is then manipulated to allow a controlled release of the lifting strap so that the intermediate support strap takes up the full weight of the motorcycle and holds the motorcycle to allow the user to adjust the lifting strap about the spindle.

The ratchet manipulation is typically accomplished by pushing the handle to its lowest position to release the pawl under the spindle. While holding the pawl in its released position, the handle is pivoted to controllably release the lifting strap, lowering the motorcycle onto the intermediate support strap. Once the motorcycle is supported completely by the intermediate support strap, the lifting strap wrapped about the spindle is pulled from the spindle. The pawl is let go and the pawl is allowed to re-engage with the sprockets. The excess lifting strap is then pulled through the ratchet mechanism until the excess is pulled through leaving only a small amount of slack between the spindle and the motorcycle. The lifting strap is then engaged about the spindle until taut. Once taut, the ratchet mechanism is operated as before and the lifting strap is allowed to be taken up around the spindle once again. Continue the motorcycle lifting process until the motorcycle is in position to allow uprighting the motorcycle by moving to the opposite side and performing the tasks as explained previously.

DETAILED DESCRIPTION OF THE PREFERRED EMBODIMENT

Figure 1:
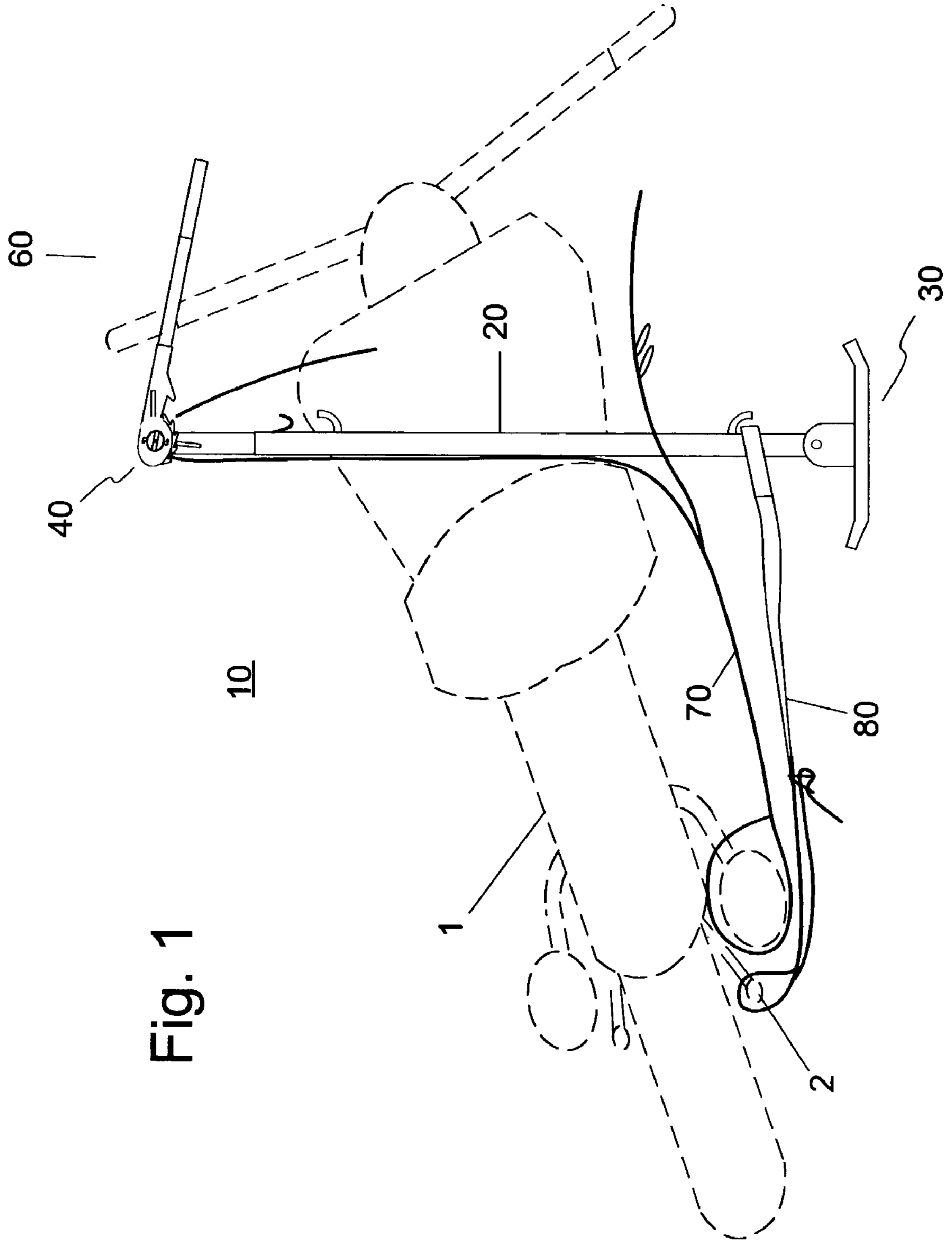
FIG. 1 is a side view of the present invention showing the erecting device attached to a motorcycle and ready for operation.

The preferred embodiment(s) of the present invention is illustrated in FIGS. 1–6. Turning now to FIG. 1, there is illustrated a vehicle uprighting device 10 having a support body 20, a stabilizing base 30 connected to the bottom of support body 20, a ratchet mechanism 40 connected to the top of support body 20, a handle 60 connected to ratchet mechanism 40, a lifting strap 70 for attaching on one end to a motorcycle 1 and to be taken up by ratchet mechanism 40 at a predetermined location along its length, and a spreader strap 80 attached to a motorcycle 1. Spreader strap 80 is secured on one end to the lower frame 2 of motorcycle 1 adjacent the transmission (not shown) of motorcycle 1 and engaged with a lower portion of support body 20.

Figure 2:
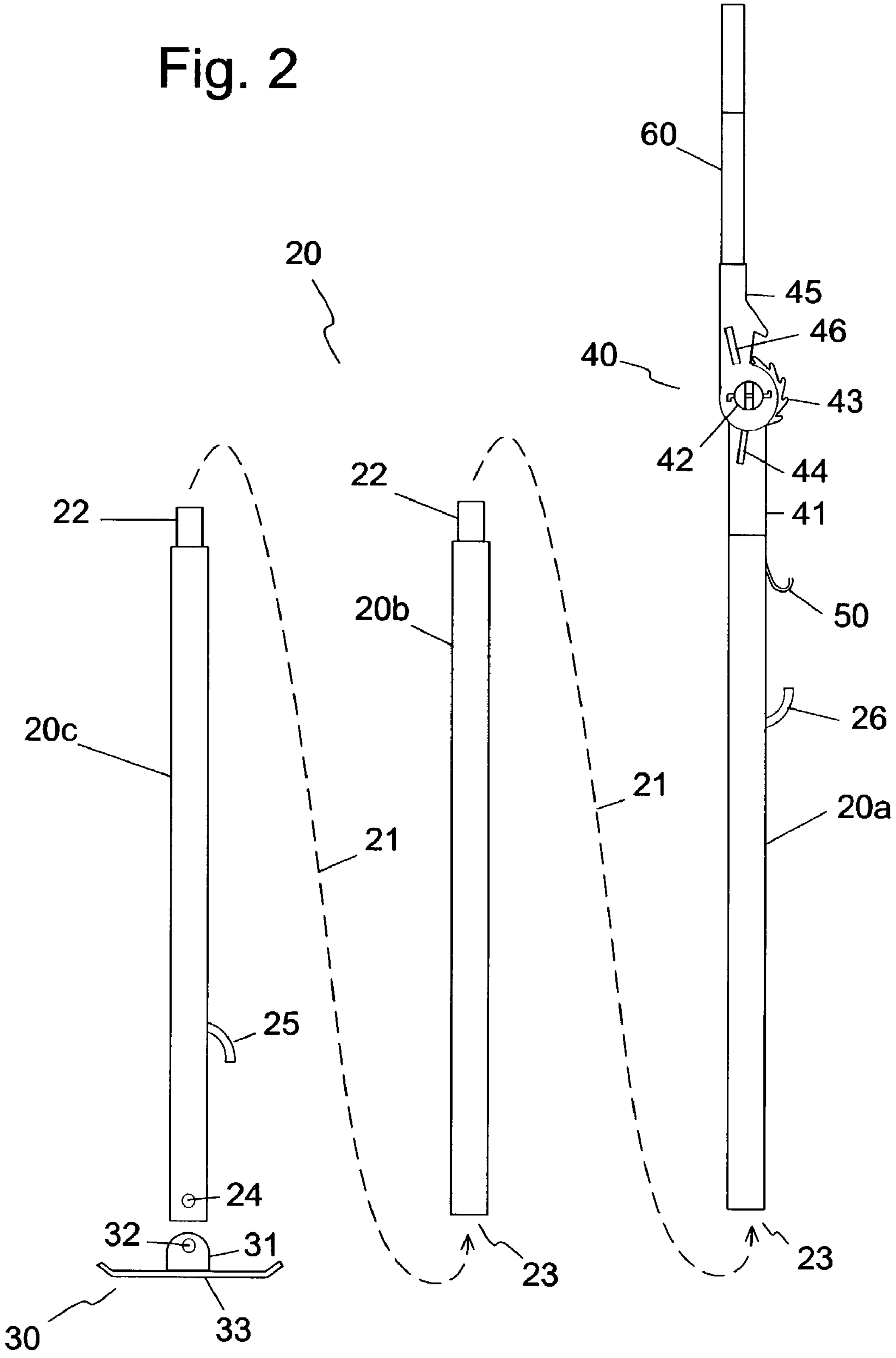
FIG. 2 is a side view of some of the components of the present invention showing a support bar and handle.

In one embodiment of the present invention, support body 20 of uprighting device 10 comprises three sections, a top section 20*a*, a middle section 20*b*, and a bottom section 20*c* as illustrated in FIG. 2. Sections 20*a*, 20*b* and 20*c* are connected in series as indicated by arrows 21. Sections 20*b*, 20*c* each have a protrusion 22 of reduced diameter on one end for insertion into corresponding recesses 23 of adjacent sections as indicated by arrows 21. Preferably, sections 20*a*, 20*b* and 20*c* are in slidable engagement with an adjacent section. Protrusions 22 may be integrally formed with sections 20*b*, 20*c* or may be separate inserts for joining the sections together. If separate inserts are used, the inserts may be affixed to one end of the appropriate sections. Affixing the inserts will reduce the number of parts and the likelihood of loosing one of the inserts. It is noted that any known structure for joining adjacent sections of tubing or rods in series may be used, for example, a spring-biased button engageable with a receiving hole, threads, collars, twist and lock mechanisms, and the like.

Stabilizing base 30 is preferably pivotally connected to bottom section 20*c* by a pivot pin (not shown) inserted through the aligned holes of base hole 32 in base tab 31 and bottom section hole 24 of bottom section 20*c*. Base surface 33 may optionally have a non-slip coating or layer.

Support body 20 may optionally include a lower hook 25 on bottom section 20*c* and an upper hook 26 on top section 20*a*. Hooks 25, 26 function to prevent possible slippage of the straps preferably used in the present invention, which are described later. Ratchet mechanism 40 may also be in slidable engagement with top section 20*a*, but is preferably affixed to top section 20*a* for better strength and reliability when using the present invention. Handle 60 may be either fixedly or removably attached to ratchet mechanism 40.

Ratchet mechanism 40 is typical of those used with and known in the industry as ratcheting straps. Ratchet mechanism 40 typically has an arm 41 mounted to a spindle 42. Spindle 42 has a pair of sprockets 43 (only one shown), each of which is mounted at a respective end of spindle 42. A spring-loaded catch 44 is attached to arm 41 and is biasedly engaged with the sprockets 43. Also included is a lever 45 which is rotatably mounted to spindle 42 and which supports a spring-loaded pawl 46 that is biasedly engaged with the sprockets 43. To facilitate release of either catch 44 or pawl 46, an extended release 50 may optionally be included. As shown, handle 60 is in the full, open position where the catch 44 and the pawl 46 are disengaged with the sprockets 43.

Figure 3:
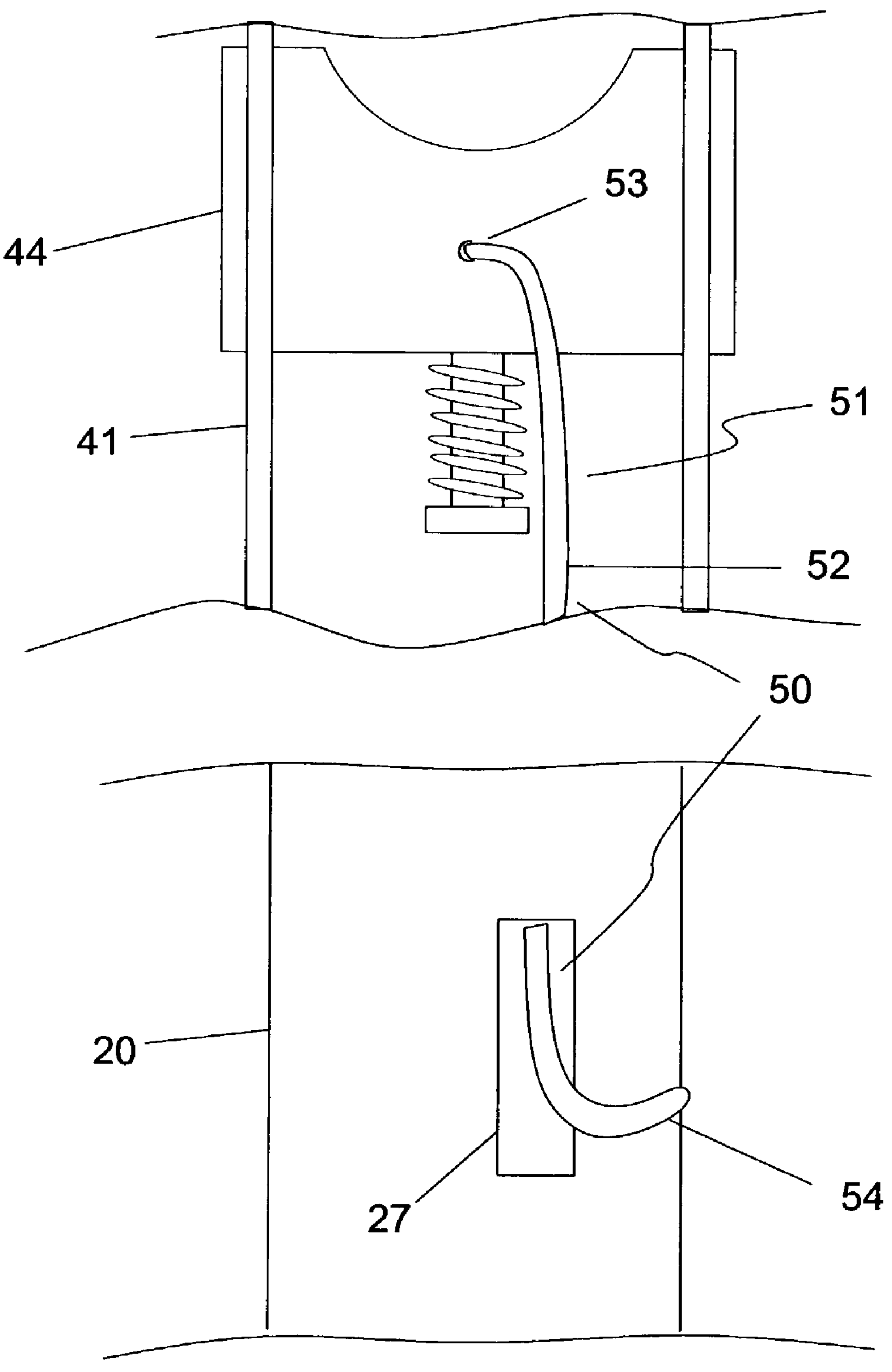
FIG. 3 is a front view of a portion of the ratchet mechanism of the present invention showing the extended catch release.

Turning now to FIG. 3, extended release 50 may be a rigid J-shaped rod 51 having an elongated release section or bar 52 with a ratchet connecting end 53 and a J-shaped handle end 54. Ratchet connecting end 53 is connected to the spring-loaded catch 44. J-shaped handle end 54 is spaced from catch 44 along the support body 20 for easy release of catch 44 by the user. Where tubing is used for support body 20, it is convenient to have a substantial portion of extended release 50 inside support body 20 with J-shaped handle end 54 protruding through a small, elongated opening 27 in the sidewall of the support body 20 to the outside for easy access to operate extended release 50. It is noted that the release is not limited to being a rigid J-shaped rod or bar. Other materials such as rope, wire, wire rope, and the like may be used along with loops or release handles such that the releasing action may still be accomplished in order to facilitate release of spring-loaded catch 44. Other structural designs may be used and are a contemplated to be covered by the scope of the present invention. An extended release 50 may also optionally be incorporated into handle 60 to facilitate release of pawl 46 on lever 45, as shown in FIG. 2.

Figure 4:
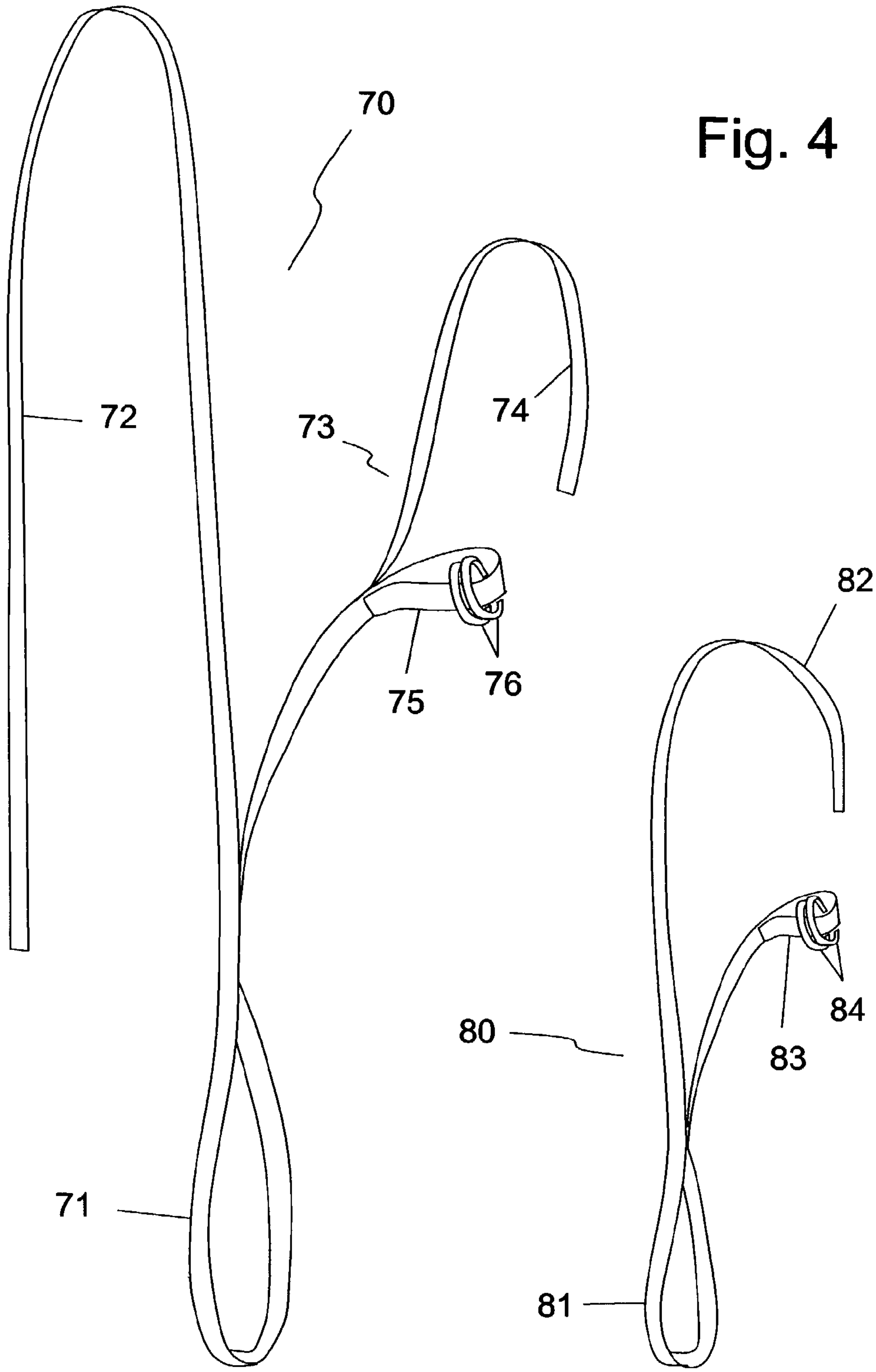
FIG. 4 is a perspective view of some of the components of the present invention showing a lifting strap and a slip-preventing or spreader strap.

Referring to FIG. 4, the preferred embodiment of lifting strap 70 is shown. Lifting strap 70 comprises a vehicle loop end 71, a spindle portion 72, and an attached intermediate support strap 73. Intermediate support strap 73 includes a support body portion 74 and a clasp end 75. Clasp end 75 further includes a pair of O-shaped or D-shaped rings 76 for receiving support body portion 74 in a holding engagement configuration, as is known in the art. Vehicle loop end 71 is preferably a closed loop for pulling lift strap 70 therethrough forming a secure, closed-loop attachment about the frame or exhaust system of motorcycle 1.

Optional spreader strap 80 includes a frame loop end 81, which is preferably a closed-loop end, for pulling spreader strap 80 therethrough forming a secure closed-loop attachment, a vehicle holding portion 82 and a spreader clasp end 83. Spreader clasp end 83 further includes a pair of O-shaped or D-shaped rings 84 for receiving vehicle holding portion 82 in holding engagement, as is known in the art. Optional spreader strap 80 may also be a chain or rope structure with hook-type ends or an adjustable rod with hook-type ends for attaching to the motorcycle and the support bar, respectively.

It is noted that the optional intermediate support strap 73 may be a separate strap, similar in structure to spreader strap 80. It should also be understood that the use of a closed-loop end is not limiting and that an open loop portion with a clasp mechanism spaced from the end for receiving the open portion of the strap is also within the scope of the present invention.

Figure 5:
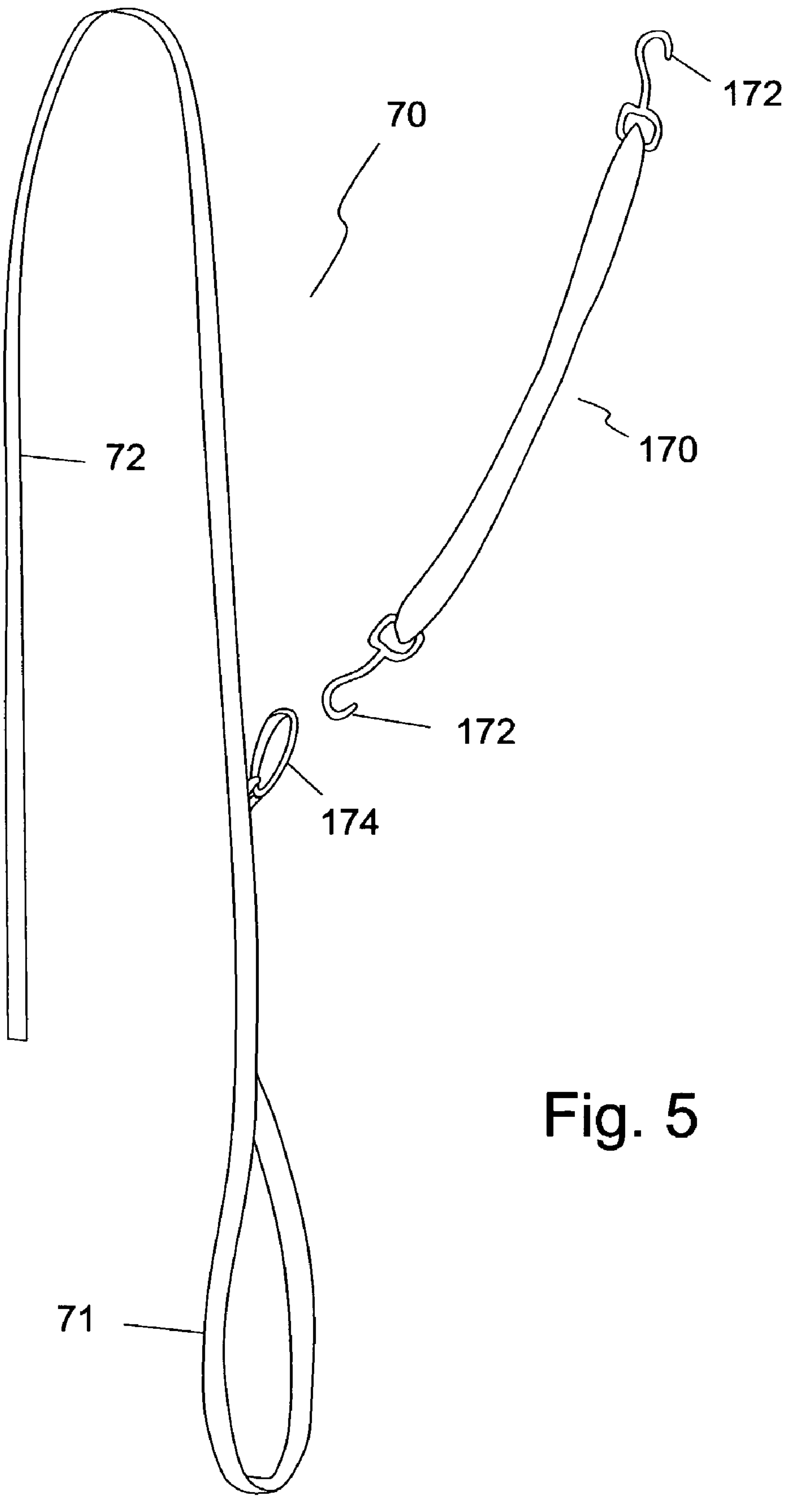
FIG. 5 is an enlarged partial view of another embodiment of intermediate support strap of the present invention showing the hook-type ends of the support strap and an attachment point along the lifting strap.

In another embodiment, an intermediate support component 170 may be a strap or cord or chain or rod with hook-type ends 172 where one hook-type end is adapted for attaching to an attachment point 174 along lifting strap 70 and the other hook-type end is adapted for attaching to the upper portion of support bar 20, as illustrated in FIG. 5.

Figure 6:
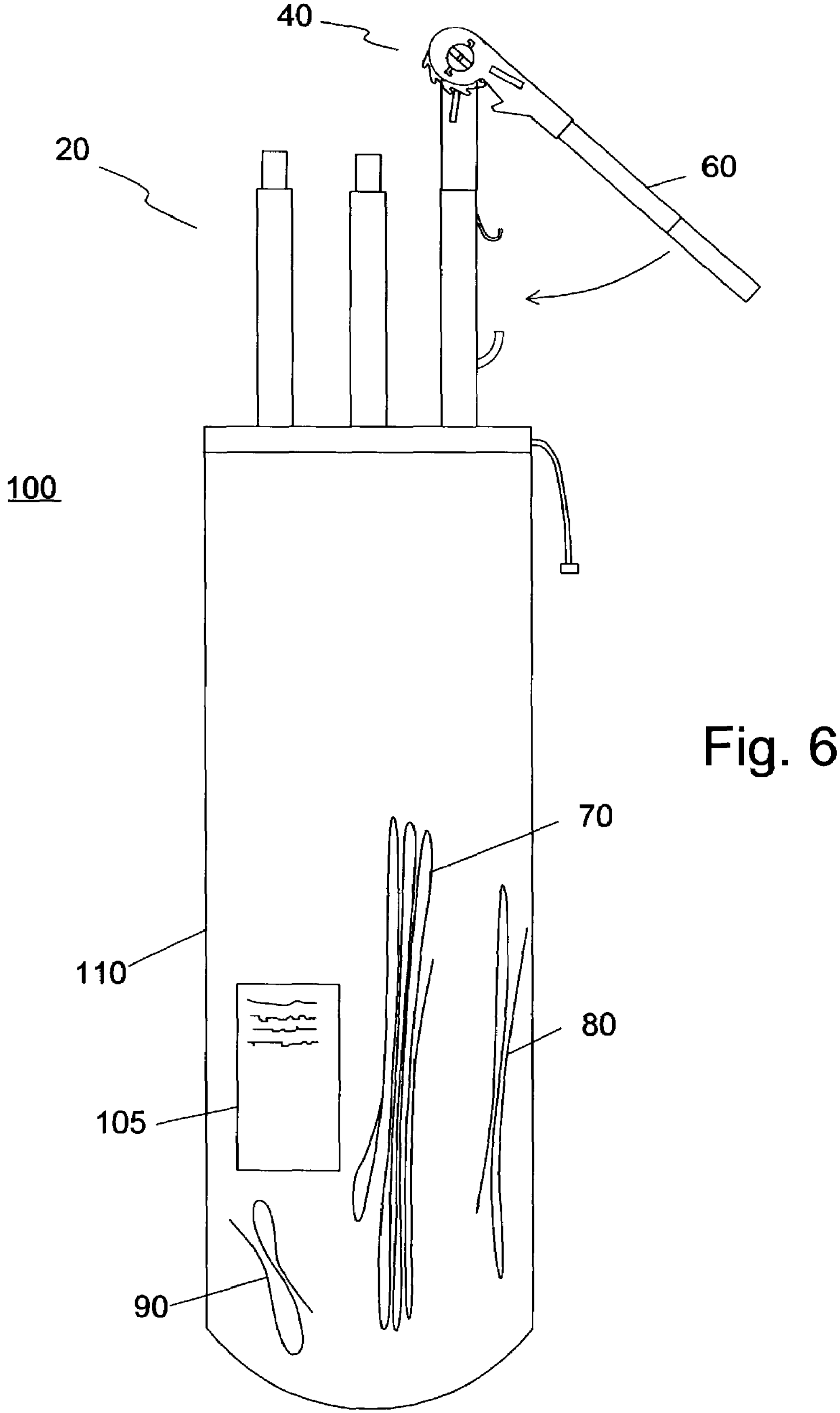
FIG. 6 is a side view of a kit of the present invention showing a component holding pouch or duffel.

The present invention may also be provided as a self-contained kit 100 as shown in FIG. 6. Kit 100 includes at least the minimal components of lifting device 10, which are the support body 20, the ratchet mechanism 40, the handle 60 and the lifting strap 70. Kit 100 may also include a spreader strap 80, an intermediate support strap 90 as a separate strap or as an integral part of lifting strap 70, instructions 105 for assembling and using lifting device 10, and a duffel 110 for storing the components of kit 100. The straps of kit 100 may be color coded to simplify the assembly and use instructions. The instructions 105 may be imprinted on a separate sheet or imprinted on the wall of duffel 110 or otherwise secured to duffel 110 to prevent inadvertent loss of the instructions.

To use the preferred embodiment of erecting device 10, a user attaches vehicle loop end 71 of lifting strap 70 to the lower frame 2 adjacent the transmission of motorcycle 1. Support bar 20 is placed in a substantially vertical position against the seat of motorcycle 1 about two inches from the rear of the fuel tank with the stabilizing base 30 on the ground. Loose end, i.e. spindle end 72, of lifting strap 70 is inserted through ratchet mechanism 40 so that the strap 70 can be drawn about spindle 42. Ratchet mechanism 40 is operated in a levered action to take up enough of lifting strap 70 so that the tension on lifting strap 70 maintains support bar 20 in a relatively vertical position. It is advisable to place a cushioning material between the seat and support bar 70 to protect the seat as the motorcycle 1 is raised and the seat approaches and potentially contacts ratchet mechanism 40. The cushioning material may be a jacket or the duffel 110 used for storing the present invention.

Where a slip-preventing support such as spreader strap 80 is used, frame loop end 81 of spreader strap 80 is attached to the lower frame or exhaust pipe of motorcycle 1. Vehicle holding portion 82 is looped around the lower section of the support bar 20 below the hook-type structure 25 (if so equipped) located on the bottom section 20*c* of support body 20 and secured to spreader clasp end 83, leaving a little slack in the spreader strap 80. Handle 60 is then grasped and ratchet mechanism 40 operated to tighten lifting strap 70, which begins lifting motorcycle 1. Once motorcycle 1 is raised enough to its upright position, the user may move to the other side of motorcycle 1 and stand on a foot peg or running board and physically right motorcycle 1 to its full upright position.

On motorcycles with no motor guards or crash bars, spindle 42 may not have enough capacity to ratchet motorcycle 1 to its upright position in one stage. Two stages may be required. In this case, an intermediate support component of strap is required. The procedure is the same as previously described except that once motorcycle 1 is up about halfway, intermediate support strap 73, if integral with lifting strap 70, is looped around the upper portion of support bar 20 above upper hook-type structure 26, threaded through rings 76 of clasp end 75 in holding engagement configuration and tightened. Ratchet mechanism 40 is then manipulated to allow a controlled release of lifting strap 70 so that intermediate strap 73 holds and supports motorcycle 1.

The ratchet manipulation is typically accomplished by pushing handle 60 to its lowest position, i.e. closest to support bar 20, for releasing catch 44 from sprockets 43. While holding catch 44 in its released position, handle 60 is pivoted away from support bar 20 to controllably release lifting strap 70. Catch 44 is then allowed to engage sprockets 43. Once engaged, pawl 46 of lever 45 is released from sprockets 43 allowing handle 60 to be repositioned adjacent support bar 20 where pawl 46 is then re-engaged with sprockets 43 for controllable release of lifting strap 70. This disengaging and re-engaging of catch 44 and pawl 46 in alternating fashion is continued until motorcycle 1 is lowered onto intermediate support strap 73.

Once motorcycle 1 is supported completely by intermediate strap 80, handle 60 is moved to its spindle release position by holding pawl 46 to disengage pawl 46 from sprockets 43. Once handle 60 is raised to its full, open, spindle release position, pawl 46 is released to engage within a handle holding notch in the periphery of arm 41. Coincident with raising handle 60 to its full open position, the periphery of lever 45 that encircles spindle 42 at its ends engages and moves catch 44 to its release position, allowing spindle 42 to freely rotate. Lifting strap 70, which is wrapped about spindle 42, is pulled from spindle 42 until free.

The excess lifting strap 70 is then pulled through ratchet mechanism 40 until substantially all of the excess of lifting strap 70 is passed through ratchet mechanism 40. Pawl 46 is then pulled to disengage with the handle holding notch in order to release handle 60 from its full open position. Handle 60 is rotated toward support bar 20 and pawl 46 is allowed to re-engage with the sprockets 43. Lifting strap 70 is then wrapped about spindle 43 and ratchet mechanism 40 operated until lifting strap 70 between spindle 43 and motorcycle 1 becomes taut. Once taut, ratchet mechanism 40 is then operated in the normal fashion and lifting strap 70 is allowed to be taken up around spindle 43 once again to continue the lifting process. The lifting process is continued until motorcycle 1 is in position to allow uprighting of motorcycle 1 by moving to the opposite side and performing the tasks as explained above.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A two-wheeled vehicle uprighting device comprising:
a support bar having a first bar end and a second bar end;
a stabilizing base at said second bar end;
a ratchet mechanism having an arm and a lever, said arm attached to said first bar end wherein said lever has a range of motion from a first position that is substantially close to said support bar to a second position that is substantially aligned to said support bar wherein said lever has a range of motion from a first position that is substantially coincident with said arm to a second position that is substantially aligned to said arm;
a handle attached to said lever; and
a lifting strap having a first lifting end configured for attachment to a lower portion of a two-wheeled-vehicle and a second lifting end for engaging relationship about a spindle of said ratchet mechanism.

2. The device of claim 1 wherein said support bar further comprises a top section, a middle section and a bottom section wherein said top section incorporates said first bar end and said bottom section incorporates said second bar end.

3. The device of claim 1 wherein said support bar includes an upper hook-type structure positioned on an upper portion of said support bar.

4. The device of claim 1 wherein said support bar includes a lower hook-type structure positioned on a lower portion of said support bar.

5. The device of claim 1 further comprising a spreader support having a vehicle attachment end and a lower support bar attachment end.

6. The device of claim 1 further comprising an intermediate support strap having a vehicle attachment end and an upper support bar attachment end.

7. The device of claim 1 further comprising an intermediate support component having a first end adapted for connecting to an attaching point along the length of said lifting strap and attaching a second end of said intermediate support component to an upper portion of said support bar.

8. The device of claim 1 wherein said lifting strap further includes an intermediate support strap portion having a support bar end and a clasp end for receiving said support bar end in a fastening relationship.

9. The device of claim 1 wherein said ratchet mechanism includes an extended release.

10. A vehicle erecting kit comprising:
a support bar having a stabilizing base on one end and a ratchet mechanism on an opposite end wherein said lever has a range of motion from a first position that is substantially close to said support bar to a second position that is substantially aligned to said support bar; wherein said lever has a range of motion from a first position that is substantially coincident with said arm to a second position that is substantially aligned to said arm;
a lifting strap having a vehicle attachment end and a strap body wherein said strap body is adapted for engaging about a spindle of said ratchet mechanism; and
instructions for using said erecting kit.

11. The kit of claim 10 further comprising a housing to contain said support bar and said lifting strap.

12. The kit of claim 11 wherein said housing is a duffel.

13. The kit of claim 10 further comprising a spreader support adapted to be connected on one end to a vehicle and on an opposite end to a lower portion of said support bar spaced from said stabilizing base.

14. The kit of claim 10 further comprising an intermediate support strap having a first support strap end and a second support strap end, said first strap end adapted for connection to a lower frame of a motorcycle and said second strap end adapted to connection about an upper portion of said support bar spaced from said ratchet mechanism.

15. The kit of claim 10 further comprising an intermediate support component having a first end adapted for connecting to an attaching point along the length of said lifting strap and a second end adapted for attaching to an upper portion of said support bar.

16. The kit of claim 10 wherein said lifting strap further includes an intermediate support strap fixedly attached along a portion of said lifting strap, said intermediate support strap having a support bar end and a clasp end for receiving said support bar end in a fastening relationship.

17. The kit of claim 10 wherein said support bar further includes two or more sectional lengths adapted for removable serial connection.

18. The kit of claim 10 wherein said support bar further includes an upper hook-type structure positioned on an upper portion of said support bar.

19. The kit of claim 10 wherein said support bar further includes a lower hook-type structure positioned on a lower portion of said support bar.

20. The kit of claim 10 wherein said ratchet mechanism further includes a handle.

21. The kit of claim 10 wherein said ratchet mechanism further includes an extended release.

* * * * *